United States Patent
Nakamura et al.

(10) Patent No.: US 8,231,441 B2
(45) Date of Patent: Jul. 31, 2012

(54) STUFFING APPARATUS AND CASING BREAKAGE DETECTING DEVICE FOR STUFFING APPARATUS

(75) Inventors: Tatsuo Nakamura, Kanagawa (JP); Yoshinori Kamakura, Kanagawa (JP)

(73) Assignee: Hitec Co., Ltd., Kanagawa (JP)

( * ) Notice: Subject to any disclaimer, the term of this patent is extended or adjusted under 35 U.S.C. 154(b) by 0 days.

(21) Appl. No.: 13/231,345

(22) Filed: Sep. 13, 2011

(65) Prior Publication Data

US 2012/0064812 A1 Mar. 15, 2012

(30) Foreign Application Priority Data

Sep. 15, 2010 (JP) .................................. 2010-206473

(51) Int. Cl.
*A22C 11/04* (2006.01)
*A22C 11/06* (2006.01)

(52) U.S. Cl. ................. 452/33; 452/22; 452/25; 452/34

(58) Field of Classification Search .................... 452/22, 452/24–25, 30–39
See application file for complete search history.

(56) References Cited

U.S. PATENT DOCUMENTS

| | | | | |
|---|---|---|---|---|
| 4,257,146 A | * | 3/1981 | Karp .............................. | 452/31 |
| 4,590,830 A | * | 5/1986 | Duroyon et al. ................ | 452/38 |
| 4,602,402 A | | 7/1986 | Schnell | |
| 5,152,712 A | * | 10/1992 | Nausedas ........................ | 452/38 |
| 5,788,563 A | | 8/1998 | Nakamura et al. | |
| 5,830,050 A | | 11/1998 | Nakamura et al. | |
| 5,842,914 A | | 12/1998 | Vermeer et al. | |
| 6,059,647 A | * | 5/2000 | Imaura ............................ | 452/50 |
| 6,066,035 A | * | 5/2000 | Hergott et al. .................. | 452/31 |
| 6,558,241 B2 | | 5/2003 | Hergott et al. | |
| 6,719,621 B2 | * | 4/2004 | Hergott et al. .................. | 452/33 |
| 6,846,234 B1 | * | 1/2005 | Hergott et al. .................. | 452/32 |
| 6,875,100 B2 | * | 4/2005 | Topfer ............................. | 452/40 |
| 7,182,684 B2 | * | 2/2007 | Hergott et al. .................. | 452/37 |

FOREIGN PATENT DOCUMENTS

| | | |
|---|---|---|
| JP | 59183646 | 10/1984 |
| JP | 6-29989 | 8/1994 |
| JP | 8103206 | 4/1996 |
| JP | 2004524008 | 8/2004 |
| JP | 3723656 | 12/2005 |

OTHER PUBLICATIONS

SMC Catalog, PFM710, 2-Color Display Digital Flow Switch, Series PFM, pp. 1-17, 2006, Japan.
Keyence Catalog, Digital Pressure Sensor, AP-C/V Series, AP-C30, pp. 1-12, 2007, Japan.

* cited by examiner

Primary Examiner — David Parsley
(74) Attorney, Agent, or Firm — Bachman & LaPointe, P.C.

(57) ABSTRACT

A stuffing apparatus includes: a stuffing nozzle for discharging a stuffing material from a discharge port into a casing; a stuffing pump for feeding the stuffing material into the stuffing nozzle; a casing pushing device which has a casing pusher and a fluid cylinder having a cylinder, a piston, and a rod, and which is adapted to push in a direction toward the discharge port of said stuffing nozzle a trailing end portion of a casing which is yet to be stuffed and is in a shirred state; and a movement stop detecting device (casing breakage detecting device) for detecting stoppage of the casing pushing device in the course of its movement.

8 Claims, 15 Drawing Sheets

STUFFING APPARATUS AND CASING BREAKAGE DETECTING DEVICE FOR STUFFING APPARATUS

BACKGROUND OF THE INVENTION

1. Field of the Invention

The present invention relates to a device for indirectly detecting a casing breakage during material stuffing in a stuffing apparatus for manufacturing sausages, fish feeds, or the like.

2. Description of the Related Art

Sausage products are manufactured by stuffing a material such as meat, i.e., a stuffing material, into an artificial casing such as a cellulose casing or a collagen casing or a casing of an animal intestine such as a sheep intestine or a hog intestine. In addition, sausage-like assorted feeds in which a material stuffed in a collagen casing are manufactured as feeds for cultured tuna.

FIG. 15 shows a conventional stuffing apparatus. A stuffing apparatus 1 includes, among others, a stuffing nozzle 3 for feeding a material such as meat, i.e., the stuffing material, into a casing 2; a stuffing pump 4 for feeding the material into the stuffing nozzle 3; a stuffing nozzle rotating means 5 for rotating the stuffing nozzle 3; a braking mechanism 6 which is engaged with the casing 2; and a pincher device 8 for feeding a stuffed casing 7 with the material filled therein forwardly (in a direction away from the stuffing nozzle 3) and pinching it.

Further, the material is fed from the stuffing pump 4 into the stuffing nozzle 3, and while the shirred casing 2 loaded on the outer periphery of the stuffing nozzle 3 is being rotated together with the stuffing nozzle 3 and the braking member 6, the material in the stuffing nozzle 3 is filled into the casing 2 pulled out and stretched forwardly. Further, the stuffed casing 7 with the material filled therein is pinched by the pincher device 8, and a twist is formed in that pinched portion by the rotation of the stuffing nozzle 3 and the like, to thereby manufacture a sausage product or the like.

It should be noted that a trailing end portion 2a of the shirred casing 2 is pushed forwardly by a casing pusher 9. Further, when a terminating end of the trailing end portion 2a of the shirred casing 2 is detected by an optical sensor 10, and the optical sensor 10 detects the terminating end, the stuffing apparatus 1 is stopped (refer to Japanese Patent No. 3723656 corresponding to U.S. Pat. No. 5,788,563).

Incidentally, an artificial casing or a natural intestine casing of an animal intestine is formed in a shirred state, is loaded in that shirred state on the outer periphery of the stuffing nozzle, and is stretched by the pincher device during stuffing, and the material, i.e., the stuffing material, is stuffed into its interior. For this reason, if any slight damage is caused to the casing such as when the casing is stretched, there are cases where the damage during the stuffing of the material spreads, and the casing becomes ruptured and breaks.

The stuffing apparatus is in many cases operated automatically, and if the casing brakes during the stuffing of the material, unless the stuffing pump for feeding the material is stopped, the material continues to be discharged from the discharge port of the stuffing nozzle, impinges against the pincher device, and scatters to the surroundings. Particularly in the case of automatic operation, an operator, upon noticing a casing breakage, will press a stop switch, but the time duration when the operator is away from the stuffing apparatus is often long, so that the operator is inevitably apt to be delayed in noticing such a casing breakage. A further delay in noticing results in more material being discharged to the outside and wasted, and time and trouble are required in cleaning up the discharged material, causing production efficiency to decline correspondingly.

In addition, in the case of manual operation, the operator is able to notice a casing breakage more speedily and is able to press the stop switch quickly. This being the case, however, the material continues to be discharged to the outside until the operator presses the stop switch after noticing, so that the material is wasted by that quantity. The time and trouble for cleaning up the discharged material are also required, so that there is still a problem in that the production efficiency declines.

As an apparatus for overcoming such a problem, an apparatus disclosed in JP-UM-B-6-29989, for instance, is known. This apparatus has an optical vision sensor 17 provided forwardly above the stuffing nozzle to monitor the stuffed casing by this vision sensor 17, and in the event that the casing is broken and the material has jumped out, the vision sensor 17 detects it and the stuffing apparatus is stopped.

In addition, an apparatus disclosed in JP-T-2004-524008 (corresponding to U.S. Pat. No. 6,558,241), for instance, is known. In this apparatus, an optical or mechanical sensor 34 is provided above the pincher device disposed forwardly of the stuffing nozzle to monitor the uniformity of the diameter of the stuffed casing by this sensor 34, and in a case where an abnormality in the casing diameter is detected, the stuffing apparatus is stopped.

The apparatus disclosed in JP-UM-B-6-29989 has a sensor provided above a discharge port of the stuffing nozzle to directly detect a rupture of the casing. However, the place of installation of the sensor is difficult to secure above the discharge port of the stuffing nozzle, and even if it is possible to secure the place of installation of the sensor, there arises a need to provide an exclusive sensor supporting means consisting of, for example, an L-shape or the like and to mount the sensor on that supporting means. Therefore, the production cost increases correspondingly.

In addition, the vicinity of the discharge port of the stuffing nozzle is a place where an operation by the operator is performed at the time of setting a new casing on the stuffing nozzle, so that there is a large risk that the material and the like attached to the operator's hand or the like become splattered. Namely, the apparatus disclosed in the above-described JP-UM-B-6-29989 has a possibility that the material and the like adheres to a sensor detecting portion such as during the stuffing operation or the setting of a new casing, rendering the sensor undetectable.

Furthermore, with the apparatus disclosed in the above-described JP-UM-B-6-29989, in the event that the casing is ruptured and the material is splattered, there is a large risk of the material adhering to the sensor. Consequently, cleaning of the sensor and its surroundings becomes essential before a new casing is loaded and an ensuing operation is started. Since that much time is involved until the ensuing operation, there is a problem in that the production efficiency declines.

The apparatus disclosed in JP-T-2004-524008 also has a virtually similar problem. Namely, the apparatus disclosed in JP-T-2004-524008 has a sensor provided above the pincher device located forwardly of the stuffing nozzle to directly detect a rupture or the like of the casing. Although the sensor is mounted on a cover 26, an exclusive sensor supporting means is required for mounting it, so that the production cost increases correspondingly.

In addition, as described above, the surrounding area of the pincher device is a place where there is a large risk of the material or the like being splattered, so that the apparatus disclosed in JP-T-2004-524008 also has a possibility that the material or the like is adhered to the sensor during the stuffing operation, thereby making detection impossible.

Furthermore, with the apparatus disclosed in JP-T-2004-524008, in the same way as the apparatus of JP-UM-B-6-29989, in the event that the casing is ruptured and the material is splattered, cleaning of the sensor and its surroundings becomes essential before a new casing is loaded and an ensuing operation is started. Since that much time is involved until the ensuing operation, there is also the problem that the production efficiency declines.

In an apparatus disclosed in JP-A-8-103206 (corresponding to U.S. Pat. No. 5,830,050), a rotary roller 15 is provided on the outer periphery of the casing which is located slightly rearwardly of the discharge port of a stuffing nozzle 3 and is set in a deshirred state. Further, a sensor 16 is provided above this rotary roller 15, and the rotation of the rotary roller 15 is detected by this sensor 16 to indirectly detect a casing breakage.

However, with the apparatus disclosed in JP-A-8-103206, the sensor 16 is provided for the discharge port of the stuffing nozzle 3 in the same way as the apparatuses of JP-UM-B-6-29989 and JP-T-2004-524008, so that the place of its installation is subject to restriction, and a special mounting means is required. Hence, the production cost increases correspondingly. Furthermore, there is a possibility that the detecting portion of the sensor becomes stained by the material or the like, rendering detection difficult.

In an apparatus disclosed in U.S. Pat. No. 4,602,402 (corresponding to JP-A-59-183646), an advance mechanism 13 engaged with a rear end 11 of a casing 10 is connected to a monitoring means 19 for monitoring the advancing movement. When the casing ruptures, the advancing movement of the casing is interrupted, and the advancing movement of the advance mechanism 13 connected to a working cylinder 17 is stopped, with the result that a pulse signal from the monitoring means 19 becomes extinct. By detecting the extinction of this signal, this known apparatus indirectly detects a casing breakage and stops a pump driving means.

However, in the same way as the apparatus disclosed in JP-A-8-103206, the apparatus disclosed in U.S. Pat. No. 4,602,402 also requires a device for converting the advancing of the casing into a pulse signal, so that the structure becomes complex by that portion, and the production cost increases correspondingly.

SUMMARY OF THE INVENTION

The present invention has been devised in view of the above-described aspects, and its object is to provide a stuffing apparatus which makes it possible to enhance the degree of freedom of an installation place of a detecting device for detecting a casing breakage during the operation of the stuffing apparatus, to thereby prevent the adhesion of the material to prevent nondetectability, and which makes a special supporting means unnecessary and reduces the time period until an ensuing operation after the casing breakage.

According to a first aspect of the invention, there is provided a stuffing apparatus comprising: a stuffing nozzle for discharging a stuffing material from a discharge port into a casing; a stuffing pump for feeding the stuffing material into the stuffing nozzle; a casing pushing device which has a casing pusher and a fluid cylinder having a cylinder, a piston, and a rod, and which is adapted to push in a direction toward the discharge port of the stuffing nozzle a trailing end portion of a casing which is yet to be stuffed and is in a shirred state; and movement stop detecting means for detecting stoppage of the casing pushing device in the course of its movement, wherein in a case where the casing pushing device has stopped in the course of its movement, the stoppage of the casing pushing device is detected by the movement stop detecting means so as to stop the stuffing pump, and the movement stop detecting means detects a state of a fluid which is supplied to the cylinder.

Namely, the movement stop detecting means indirectly detects a casing breakage. It should be noted that the movement stop detecting means is able to detect not only the casing breakage but is able to indirectly detect a case where, for example, the pincher device has undergone a failure and stopped during the operation.

According to a second aspect of the invention, in addition to the construction according to the first aspect of the invention, the movement stop detecting means detects as the state of the fluid a flow rate of the fluid which is supplied to the cylinder.

According to a third aspect of the invention, in addition to the construction according to the first or second aspect of the invention, the movement stop detecting means detects as the state of the fluid a pressure of the fluid which is supplied to the cylinder. Namely, the movement stop detecting means is able to detect at least one of the flow rate of the fluid and the pressure of the fluid.

According to a fourth aspect of the invention, in addition to the construction according to the first aspect of the invention, a time of detection by the movement stop detecting means for stopping the stuffing pump is a time when the casing pushing device stops continuously for a predetermined time duration in the course of its movement.

According to a fifth aspect of the invention, there is provided a casing breakage detecting device for a stuffing apparatus including a stuffing nozzle for discharging a stuffing material from a discharge port into a casing, a stuffing pump for feeding the stuffing material into the stuffing nozzle, and a casing pushing device which has a casing pusher and a fluid cylinder having a cylinder, a piston, and a rod, and which is adapted to push in a direction toward the discharge port of the stuffing nozzle a trailing end portion of a casing which is yet to be stuffed and is in a shirred state, the casing breakage detecting device comprising: movement stop detecting means which detects stoppage of the casing pushing device in the course of its movement in a case where the casing pushing device has stopped in the course of its movement, and which outputs a signal for stopping the stuffing pump, wherein the movement stop detecting means detects a state of a fluid which is supplied to the cylinder.

According to a sixth aspect of the invention, in addition to the construction according to the fifth aspect of the invention, the movement stop detecting means detects as the state of the fluid a flow rate of the fluid which is supplied to the cylinder.

According to a seventh aspect of the invention, in addition to the construction according to the fifth aspect of the invention, the movement stop detecting means detects as the state of the fluid a pressure of the fluid which is supplied to the cylinder.

Incidentally, if the casing ruptures during the operation of the stuffing apparatus and a casing breakage occurs, the bellows-like casing (hereinafter referred to as the shirred casing) which, on the outer periphery of the stuffing nozzle, is yet to be stuffed and is shirred in the longitudinal direction of the stuffing nozzle ceases to be pulled out any further, so that the leading end portion of the shirred casing remains at its position in a state of abutting against the braking member. Then, even if the casing pushing device pushes the trailing end portion of the shirred casing, the casing pushing device is unable to move the trailing end portion forwardly any further, so that the piston of the casing pushing device also remains at that position.

In the present invention, the stoppage of the casing pushing device due to the casing breakage is detected by the movement stop detecting means, such as a flow sensor for detecting the flow rate of air (the flow rate of air becomes substantially zero if the casing pushing device stops) flowing in the air cylinder serving as the fluid cylinder, a pressure sensor for detecting the pressure of air (the air pressure increases if the casing pushing device stops) within an air cylinder. In consequence, the amount of the material discharged to the outside can be minimized by stopping at least the stuffing pump or all of the pincher device, the stuffing nozzle, the braking member, the air cylinder, and the stuffing pump (hereafter, the phrase "at least the stuffing nozzle" and the phrase "all of the pincher device, the stuffing nozzle, the braking member, the air cylinder, and the stuffing pump" will be rephrased as the stuffing pump and the like).

In addition, since the amount of material discharged to the outside can be minimized, the time period until an ensuing operation after the casing breakage can be reduced, thereby making it possible to minimize a decline in production efficiency.

Further, since the movement stop detecting means can be provided in an air passage communicating with the air cylinder, it is possible to enhance the degree of freedom of the installation place. Still further, since at least one of a flow sensor and a pressure sensor which are commercially available can be mounted on an existing apparatus by a simple mounting means, it is possible to suppress the surging of the production cost. Furthermore, even if a casing breakage occurs, since the movement stop detecting means is provided not in the vicinity of the discharge port of the stuffing nozzle but at a location rearwardly far distant from the vicinity of the discharge port of stuffing nozzle (the movement stop detecting means may be provided even in a box as in the embodiment), the adhesion of the splattered material thereto is practically nil (the adhesion becomes totally nil if it is provided in the box as in the embodiment). Hence, it is possible to further reduce the time period until an ensuing operation after the casing breakage.

Incidentally, the operation of the casing pushing device in the course of its movement is continuous. However, if variations occur in the rate of reduction of the creased casing stick length, there can occur cases where the casing pushing device undergoes an intermittent movement in which it stops momentarily and subsequently starts to move. In the case where the casing pushing device undergoes such an intermittent movement (this, of course, is a case where casing breakage has not occurred), and if the movement stop detecting means detects the momentary stoppage of the casing pushing device (i.e., erroneously detects it), and the controller is to stop the stuffing pump and the like, the production efficiency declines by the shutdown portion of the stuffing pump and the like.

According to the above-described fourth aspect of the invention, the controller stops the stuffing pump and the like in the case where the stoppage of the casing pushing device which is continuous for a predetermined time duration is detected by the movement stop detecting means. Hence, it is possible to prevent a decline in production efficiency as described above.

Furthermore, the casing breakage detecting device for a stuffing apparatus according to the above-described fifth aspect is able to indirectly detect the casing breakage by detecting the stoppage of movement of the casing pushing device when the movement of the shirred casing is stopped due to the casing breakage.

DESCRIPTION OF THE PREFERRED EMBODIMENT

Figure 1:
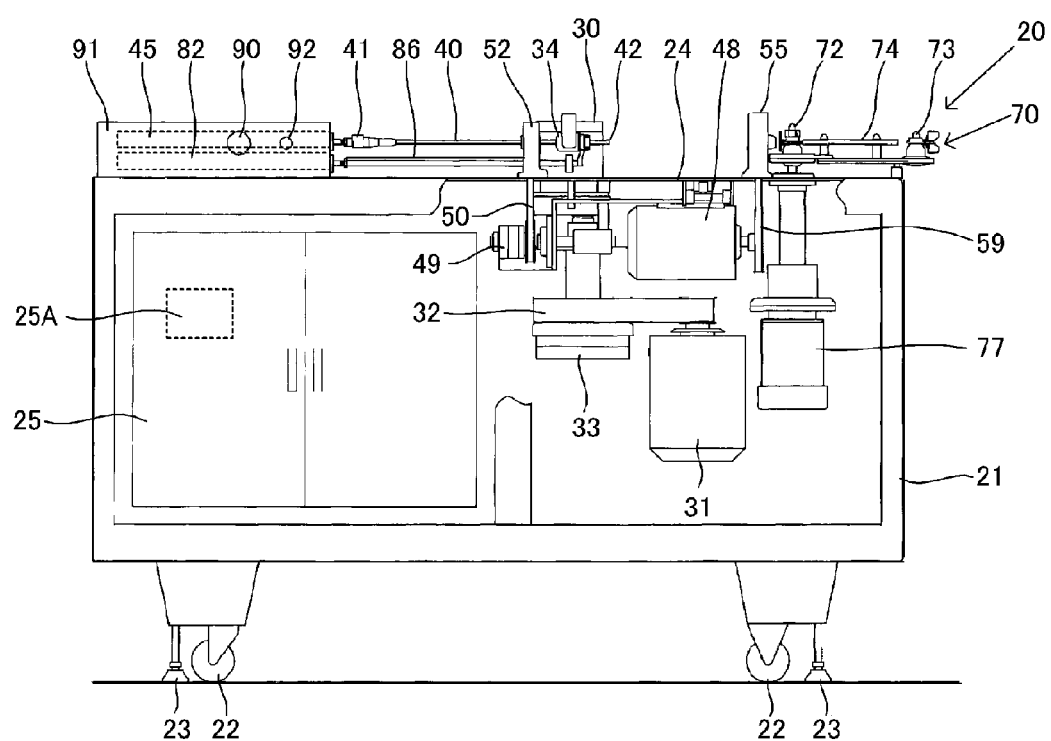
FIG. 1 is a front elevational view of a stuffing apparatus.

Referring now to the accompanying drawings, a detailed description will be given of the embodiment of the invention. It should be noted that it is assumed that, in FIG. 1, the side of a casing pushing air cylinder 82 is a rear side, and the side of a pincher device 70 is a front side.

A stuffing apparatus 20 has a box-shaped case member 21. The case member 21 is provided with legs 22 and stoppers 23 on its bottom portion and is hence movable. Mounted on its upper surface, i.e., a mounting base 24, are a stuffing pump 30, a stuffing nozzle 40, a braking mechanism 56, a pincher device 70, and the like which constitute the stuffing apparatus 20.

The stuffing pump 30 feeds a material such as meat, i.e., a stuffing material, into the stuffing nozzle 40. A speed-variable stuffing pump motor 31, a belt 32, an electromagnetic clutch 33, and the like, which constitute the driving mechanism of the stuffing pump 30, are provided in the case member 21 below the mounting base 24. The rotation of the stuffing pump motor 31 is transmitted to the stuffing pump 30 through the belt 32 and the electromagnetic clutch 33. The amount of its pump supply is made variable.

In addition, a control box 25 is provided in a left-side area of the case member 21. A controller 25A having an arithmetic processing unit, memories, and the like is accommodated in its interior. Further, the controller 25A controls the driving mechanisms of such as the stuffing pump 30, the stuffing nozzle 40, the braking mechanism 56, and the pincher device 70 which are provided in the stuffing apparatus 20. Upon receiving a signal from a below-described movement stop detecting means 100, which is a casing breakage detecting device, the controller 25A stops the stuffing pump 30 and the like.

The stuffing pump 30 has a stuffing block 34 for accommodating the material, and when an opening 40a (see FIG. 2) provided on the outer periphery of the stuffing nozzle 40 is positioned in this stuffing block 34, the stuffing pump 30 feeds the material into the stuffing nozzle 40.

The stuffing nozzle 40 is a straight pipe member having the shape of a round pipe and is installed horizontally. One end of the stuffing nozzle 40 is connected to a stuffing nozzle air cylinder 45, i.e., a driving mechanism of the stuffing nozzle 40, through a rotary joint 41, while a discharge port 42 is formed at the other end thereof. The stuffing nozzle 40 feeds the material extruded from the stuffing pump 30 into the leading end portion of a deshirred casing 43a in front of a shirred casing 43 loaded on the outer periphery of the stuffing nozzle 40

Further, a leading end portion 44b of this shirred casing 43 is drawn out and stretched forwardly on the outer peripheral surface of the stuffing nozzle 40 in the vicinity of its discharge port 42, and is thereby formed into the deshirred casing. The material is stuffed forwardly into a fore interior of this deshirred casing 43a to be thereby formed into a stuffed casing 43b.

As the shirred casing 43, an artificial casing is used in the case of this embodiment. The artificial casing is a hollow creased casing stick obtained by folding an elongated tubular body, which is constituted by such as a cellulose casing or a collagen casing, in a bellows shape along its axial direction and by compressing it. One end side of the artificial casing is open, while the other end side thereof is closed, and the artificial casing, beginning with its open side, is loaded onto the stuffing nozzle 40.

Figure 2:
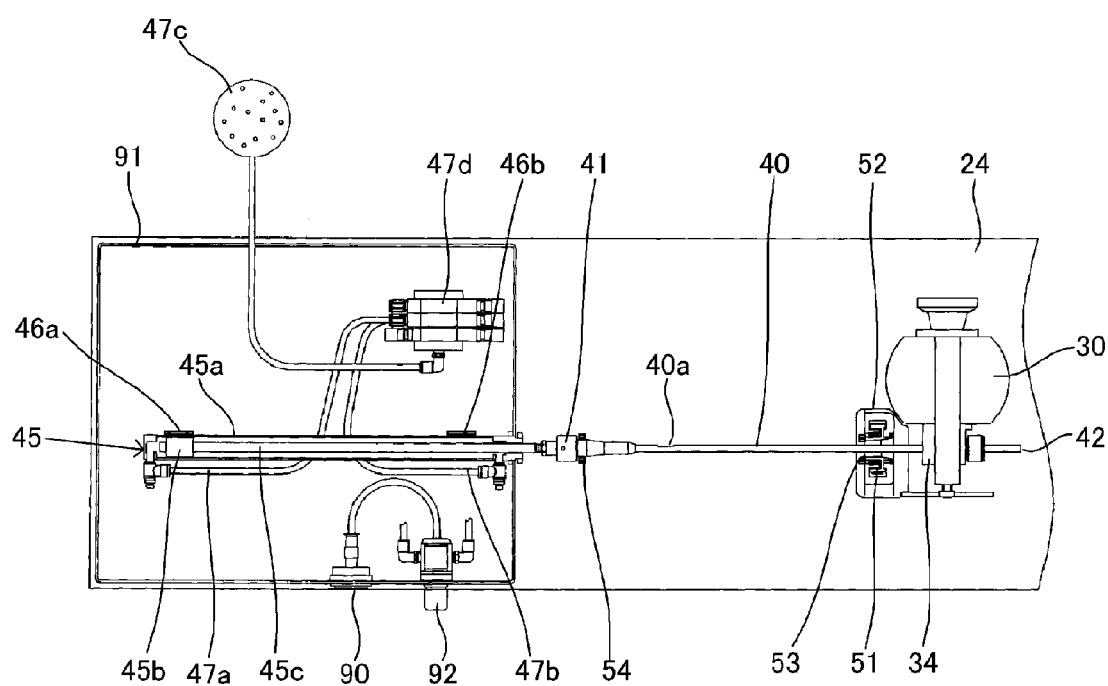
FIG. 2 is a plan view of the stuffing apparatus with a pincher device and a box omitted.

As shown in FIG. 2, the stuffing nozzle air cylinder 45 has a cylinder 45a, a piston 45b which slides in the cylinder 45a, and a rod 45c which is connected to the piston 45b. Further, the other end of the rod 45c extends to the outside and is connected to the side of the aforementioned rotary joint 41 which is opposite to its side to which the stuffing nozzle 40 is connected. For this reason, the stuffing nozzle 40 is pushed in a forward-rearward direction by the stuffing nozzle air cylinder 45, and is rotated by a below-described rotating motor 48.

The stuffing nozzle air cylinder 45 has a first reed switch 46a and a second reed switch 46b, i.e., magnetic proximity switches, which are respectively provided on left and right end portions on the outer peripheral surface of the cylinder 45a. In addition, a first passage 47a and a second passage 47b for introducing and discharging air are respectively communicated with the vicinities of the left and right end portions of the cylinder 45a, and air from an air compressor 47c is supplied into the cylinder 45a through a solenoid valve 47d and the first passage 47a or the second passage 47b.

When the air compressor 47c is driven and air is supplied from the first passage 47a into the stuffing nozzle air cylinder 45 through the solenoid valve 47d, the stuffing nozzle 40 is pushed toward the pincher device 70 side. Further, when the piston 45b reaches the position of the right end portion of the cylinder 45a and stops there, the second reed switch 46b issues a signal. The controller 25A receives that signal and starts to cause the filling into the casing.

Then, when the stuffing into the shirred casing 43 has been completed, or when casing breakage has occurred and the below-described movement stop detecting means 100 has detected the stoppage of movement of a casing pushing device 80, the piston 45b of the stuffing nozzle air cylinder 45 returns to the position of the first reed switch 46a, i.e., the initial position for loading the shirred casing 43 onto the stuffing nozzle 40, and stops at that position.

The stuffing nozzle 40 is made rotatable at an appropriate number of revolutions by a driving mechanism consisting of such as the variable-speed rotating motor 48, an electromagnetic clutch 49, a belt 50, and a rotary pulley 51 (see FIG. 2) which are provided in the case member 21 below the mounting base 24.

A first housing 52 for rotatably accommodating the aforementioned rotary pulley 51 is provided on the mounting base 24, and the rotation of the rotating motor 48 is transmitted to the rotary pulley 51 within the first housing 52 via the electromagnetic clutch 49 and the belt 50.

The aforementioned rotary pulley 51 is provided with a first clutch pawl 53 (see FIG. 2). In addition, a second clutch pawl 54 (see FIG. 2) which is engageable with the first clutch pawl 53 is provided on the outer periphery of the stuffing nozzle 40. Further, when the stuffing nozzle 40 is pushed to the stuffing position in FIG. 4 by the stuffing nozzle air cylinder 45, the first clutch pawl 53 and the second clutch pawl 54 are engaged, so that the rotation of the rotary pulley 51 is transmitted to the stuffing nozzle 40.

Figure 4:
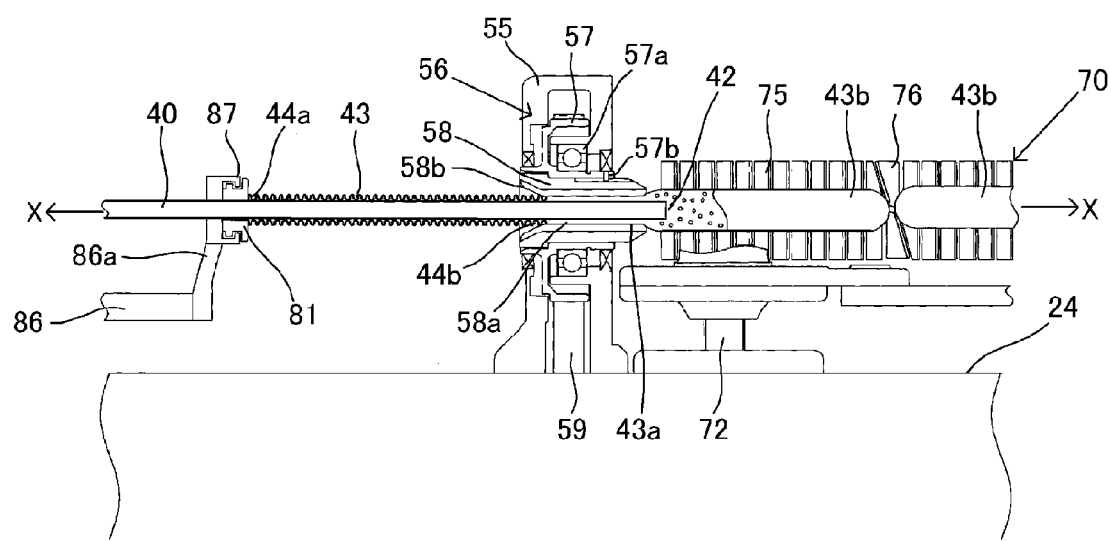
FIG. 4 is a front elevational cross-sectional view in which a discharge port and its vicinity of the stuffing nozzle are enlarged.
Figure 5:
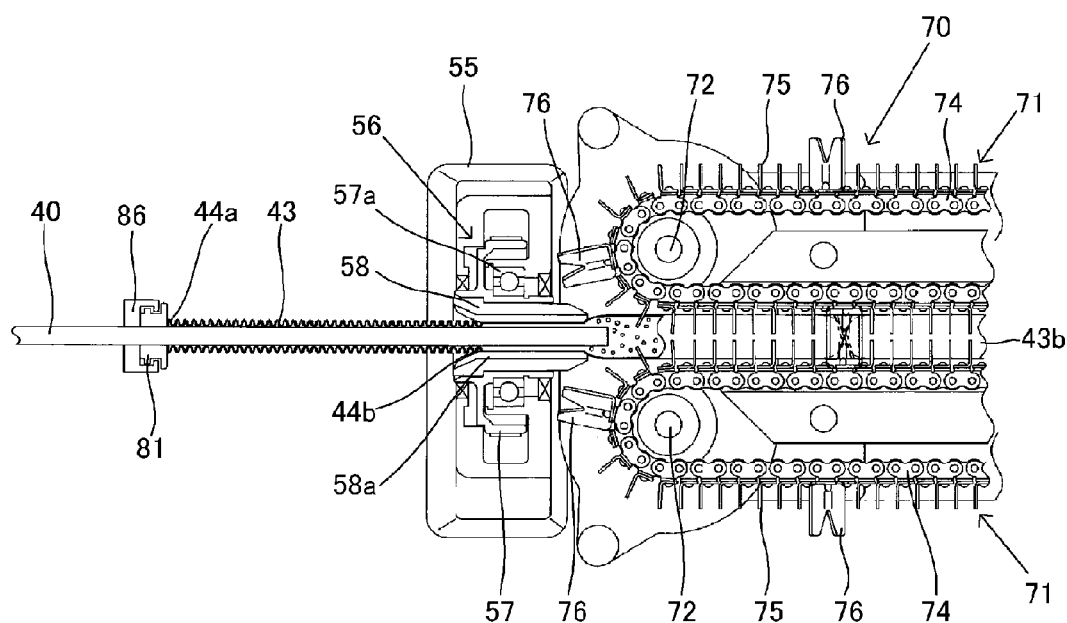
FIG. 5 is a top cross-sectional view of FIG. 4.

A second housing 55 is further provided on the mounting base 24. The braking mechanism 56 for pressing the deshirred casing 43a in a direction toward the outer periphery of the stuffing nozzle 40 is provided in this second housing 55. As shown in FIGS. 4 and 5, the braking mechanism 56 has a pulley 57 and a braking member 58.

The aforementioned pulley 57 is rotatably held by a bearing 57a, and the braking member 58 is inserted in a central opening of this pulley 57. When the braking member 58 is inserted in the pulley 57, both members 57 and 58 have their respective rotation restricted by a pin 57b and corotate.

The braking member 58 is a tubular member having a round opening in its center, and a plurality of rib-like projections 58a extending in an axial direction extend radially at equal intervals on the inner peripheral surface of that opening. Further, the inside diameter of the opening of the plurality of rib-like projections 58a is made larger than the outside diameter of the stuffing nozzle 40, and the deshirred casing 43a drawn out between the plurality of rib-like projections 58a and the outer periphery of the stuffing nozzle 40 is formed. A tapered opening portion 58b is abutted by the leading end portion 44b of the shirred casing 43 to thereby define the position of the leading end portion 44b.

The aforementioned rotating motor 48 is of a dual-shaft type, and one shaft rotates the rotary pulley 51, as described above, while the other shaft rotates the pulley 57. The rotation of the pulley 57 is effected by a belt 59 wound around the pulley 57. Further, the rotation of this pulley 57 is imparted to the stretched deshirred casing 43a and its leading end portion 44b by means of the braking member 58, and a twist is imparted to the stuffed casing 43b in front of the discharge port 42 of the stuffing nozzle 40 through cooperation with the rotation of the stuffing nozzle 40.

The pincher device 70 pinches the stuffed casing 43b with the material stuffed therein and transports it forwardly of the stuffing nozzle 40. As shown in FIG. 5, the pincher device 70 is formed by arranging a pair of wrapping connector means 71 in parallel. Each of the wrapping connector means 71 has a drive shaft 72, a driven shaft 73 (see FIG. 1), and a chain 74 wound around and trained between the drive shaft 72 and the driven shaft 73. The chain 74 has a plurality of lugs 75 and a plurality of pincher members 76.

It should be noted that the lug 75 is a member which pinches the outer periphery of the stuffed casing 43b, and the pincher member 76 is a member having a substantially V-shaped cross section so as to form an end portion by pinching the stuffed casing 43b and cause a twist in that end portion. In addition, the pincher device 70 is operated at a desired number of revolutions by a pincher motor 77 whose number of revolutions is variable.

Then, when the pair of wrapping connector means 71 disposed in parallel rotate, the plurality of lugs 75 of the respective wrapping connector means 71 advance forwardly in such a form as to pinch the stuffed casing 43b, while the plurality of pincher members 76 of each wrapping connector means 71 pinch the stuffed casing 43b to form end portions. In consequence, a twist is formed at the pinched portion by the rotation of the stuffing nozzle 40 and the braking mechanism 56.

The casing pushing device 80 pushes forwardly (toward the discharge port 42 side) a trailing end portion 44a of the shirred casing 43 loaded on the outer periphery of the stuffing nozzle 40 and thereby causes the leading end portion 44b of the shirred casing 43 to abut against the tapered opening portion 58b of the braking member 58, so as to impart a rotative force to the shirred casing 43 by the rotation of the braking member 58.

Figure 3:
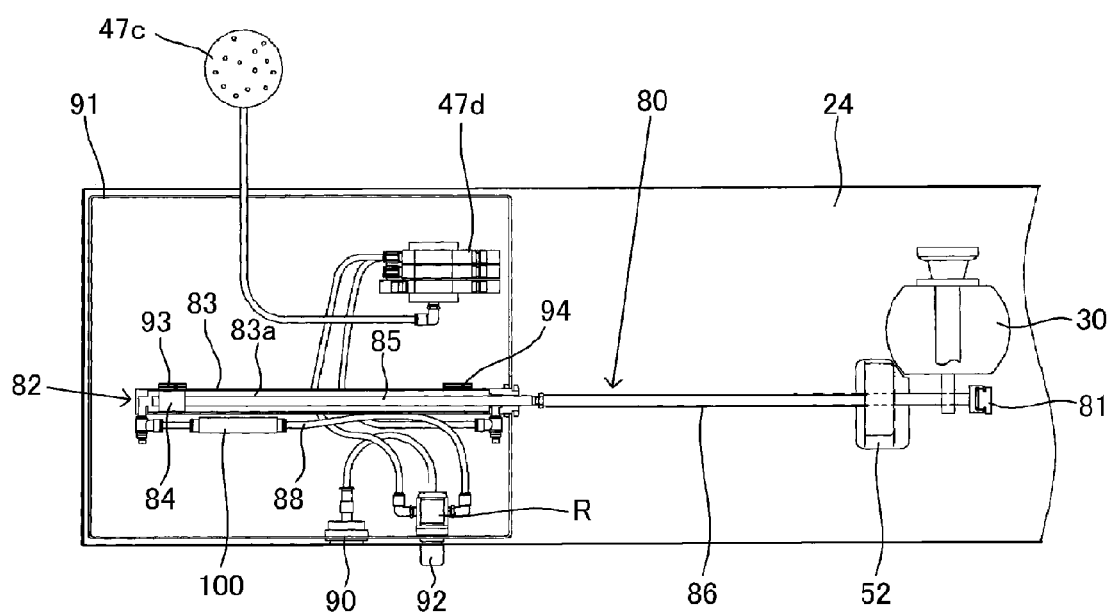
FIG. 3 is a plan view corresponding to FIG. 2 and in which a stuffing nozzle and a stuffing nozzle air cylinder are further omitted.
Figure 12:
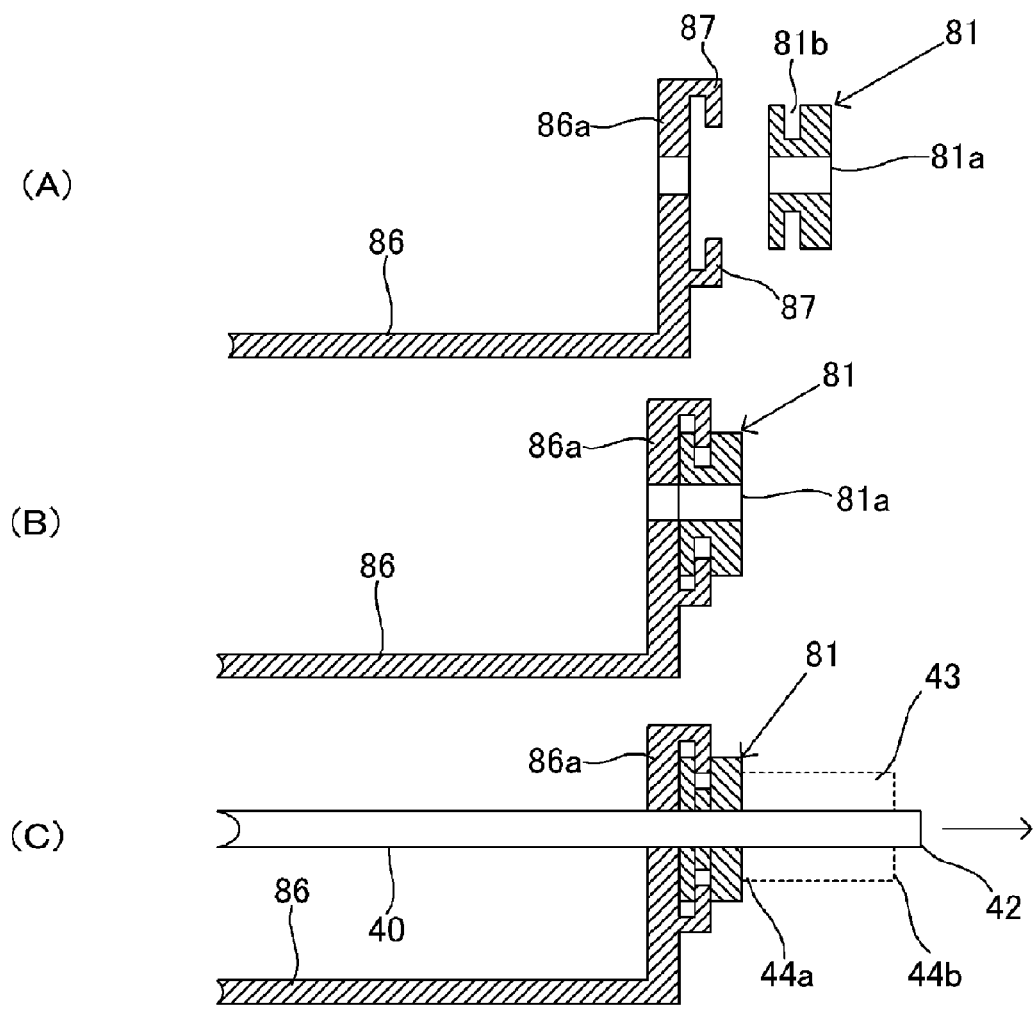
FIG. 12 is a diagram for describing the mounting of a casing pusher to the casing pushing air cylinder.
Figure 15:
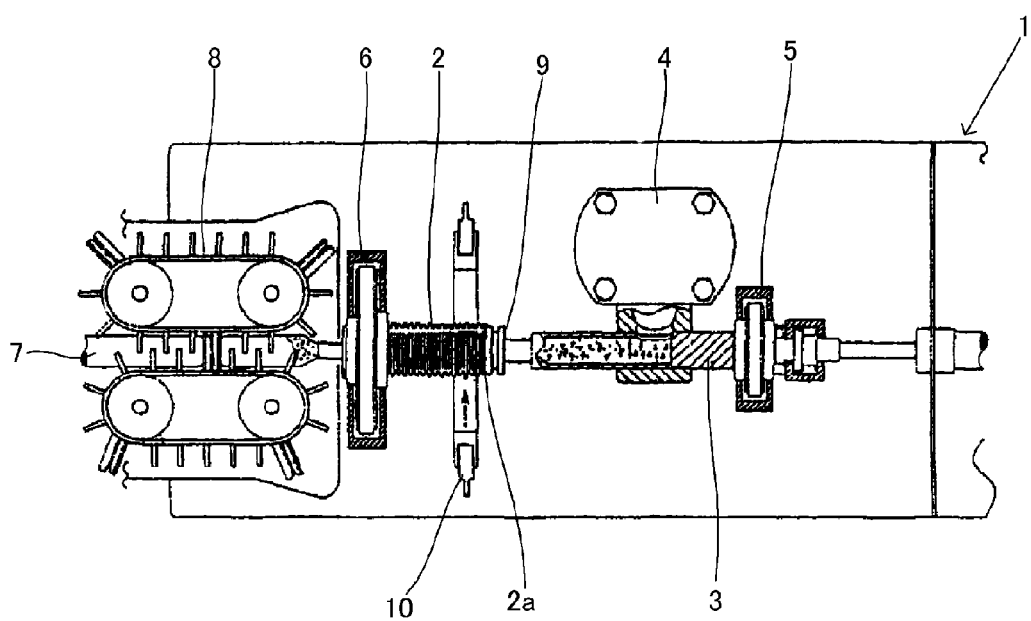
FIG. 15 is a plan view of a conventional stuffing apparatus.

The casing pushing device 80 has a casing pusher 81 and the casing pushing air cylinder 82, i.e., a driving mechanism for the casing pusher 81 (see FIG. 3). As shown in FIG. 12, the casing pusher 81 is a short-width cylindrical member having in its center a central opening 81a with an inside diameter larger than the outside diameter of the stuffing nozzle 40. The casing pusher 81 has on its outer periphery a ring groove 81b with which a pair of engaging pawls 87 at a distal end of a below-described L-shaped member 86 are engaged. If the casing pusher 81 is set by fitting the central opening 81a of the casing pusher 81 over the outer periphery of the stuffing nozzle 40, the casing pusher 81 abuts against the trailing end portion 44a of the shirred casing 43 and pushes the shirred casing 43 forwardly (toward the pincher device 70 side) as indicated by an arrow (see FIG. 15C).

Figure 6:
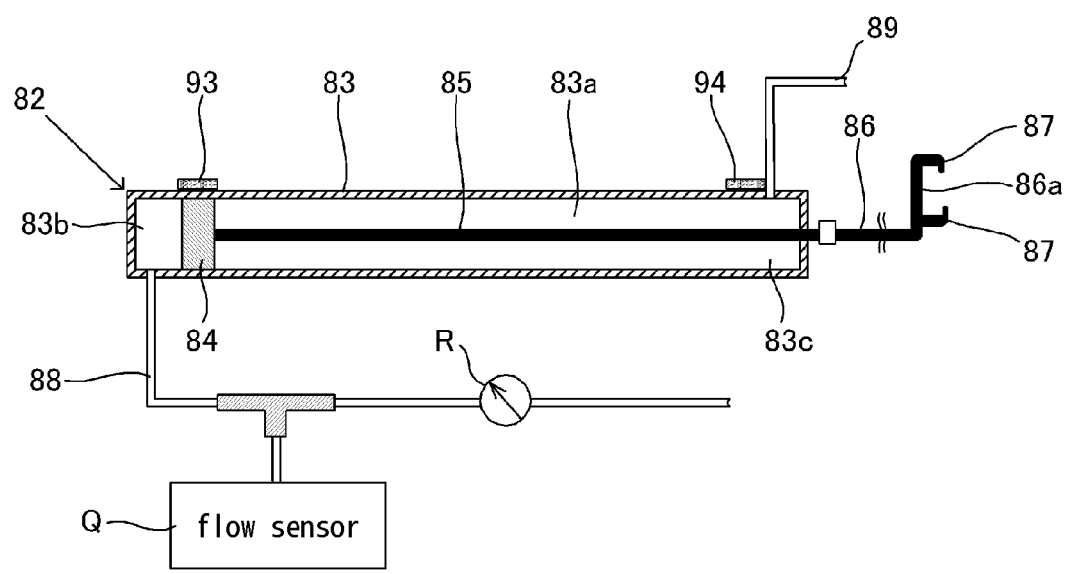
FIG. 6 is a schematic cross-sectional view of an initial state in which a movement stop detecting means is mounted on a casing pushing air cylinder.

The casing pushing air cylinder 82 is substantially similar to the stuffing nozzle air cylinder 45 and has a cylinder 83, a piston 84, and a rod 85, as shown in FIGS. 3 and 6. The cylinder 83 is an elongated, hermetically closed tubular member having an internal space 83a, the piston 84 is slidably disposed in that internal space 83a, and the internal space 83a is partitioned into a left chamber 83b and a right chamber 83c by the piston 84 in a hermetically closed state.

The rod 85 has one end connected to the piston 84 and the other end extending in an axial direction through the internal space 83a and projecting from an end portion of the cylinder 83 to the outside.

The L-shaped member 86 whose distal end is bent upward detachably meshes with the distal end portion of the rod 85. The two engaging pawls 87 each having an L-shaped cross section are provided at upper and lower positions on an upper bent portion 86a of this L-shaped member 86 in such a form that their respective distal end portions are opposed to each other.

The reason that the L-shaped member 86 is made to detachably mesh with the distal end portion of the rod 85 is that there are various types in size among the shirred casings 43, and that the casing pushers 81 and the L-shaped members 86 which correspond to the various types of casings are hence used. By adopting such a structure, it becomes possible to use shirred casings 43 of various types in size, thereby making it possible to enhance the utility of the stuffing apparatus 20. It should be noted that the rod 85 and the L-shaped member 86 may be an integrated one-piece member.

The engaging pawls 87 of the L-shaped member 86 are portions which engage the ring groove 81b of the casing pusher 81, and a description will be given of that engagement with reference to FIG. 12. The part (A) of FIG. 12 shows a state prior to the engagement between the engaging pawls 87 and the ring groove 81b. In this state, the casing pusher 81 is slid from a lateral direction (in a direction perpendicular to the plane of the drawing) with respect to the engaging pawls 87 with a substantially U-shaped cross section, and the ring groove 81b is thereby engaged with the distal ends of the engaging pawls 87, as shown in the part (B) of FIG. 12.

Next, as shown in the part (C) of FIG. 12, the stuffing nozzle 40 is fitted in the central opening 81a of the casing pusher 81. As the casing pushing air cylinder 82 is driven, the casing pusher 81 abuts against the trailing end portion 44a of the shirred casing 43 and pushes the shirred casing 43 forwardly.

The piston 84 of the casing pushing device 80 and the casing pusher 81 move simultaneously by being spaced apart from each other a predetermined distance, and a description will be given of the movement of the piston 84. Before the casing pushing air cylinder 82 is driven, the piston 84 is located at a position in the vicinity of the left end of the cylinder 83 (hereafter referred to as the initial position), as shown in FIG. 6.

As the stuffing apparatus 20 is driven, the stuffing nozzle air cylinder 45 is first actuated, and when the stuffing nozzle 40 reaches its position for starting the stuffing of the stuffing material (hereafter referred to as the stuffing position), the casing pushing air cylinder 82 is then arranged to be actuated. Hence, the piston 84 moves forwardly, so that the casing pusher 81 abuts against the trailing end portion 44a of the shirred casing 43 immediately after the start of its movement or in the course of its movement. Ultimately, the casing pusher 81 reaches a position at which all of the shirred casing 43 is drawn out and there no more shirred casing 43 to be pushed (hereafter referred to as the final position).

Then, when the stuffing into the shirred casing 43 has been completed, or when casing breakage has occurred and the below-described movement stop detecting means 100 has detected the stoppage of movement of the casing pushing device 80, the casing pusher 81 returns to the aforementioned initial position simultaneously with or slightly later than the stuffing nozzle 40, and stops at that position.

In addition, as shown in FIG. 6, a first passage 88 and a second passage 89 respectively communicate with the left chamber 83b and the right chamber 83c of the aforementioned internal space 83a. A regulator R for regulating the pressure of a fluid, a gauge 90, and the solenoid valve 47d are provided particularly in the first passage 88. Further, when the second reed switch 46b of the stuffing nozzle air cylinder 45 issues a signal, the solenoid valve 47d is switched over, and the fluid, i.e., air, of a predetermined pressure is supplied from the air compressor 47c into the left chamber 83b through the solenoid valve 47d and the regulator R, with the result that the piston 84 and the casing pusher 81 are pushed rightwardly from the initial position, i.e., forwardly. It should be noted that the fluid to be supplied may be any fluid, but air is used in this instance.

The stuffing nozzle air cylinder 45 and the casing pushing air cylinder 82 are respectively provided in parallel at upper and lower positions such that the stuffing nozzle air cylinder 45 is set at the upper position, as shown in FIG. 1. These cylinders are accommodated in a box 91 provided on the rear side of the mounting base 24.

Further, an adjusting knob 92 of the regulator R and the gauge 90 are mounted on a side wall surface on the front side of the box 91. It should be noted that the solenoid valve 47D is an integral unit in which one for the stuffing nozzle air cylinder 45 and another one for the casing pushing air cylinder are integrated, but their passages are respectively independent. In addition, the air compressor 47c is common to the stuffing nozzle air cylinder 45 and the casing pushing air cylinder 82 and is provided outside the box 91. Thus, as the movement stop detecting means (casing breakage detecting device) 100 (in this case, a flow sensor Q or a pressure sensor P) is provided within the box 91, it is possible to reliably prevent the staining due to the material and the like.

As shown in FIG. 6, a first reed switch 93 is provided on the outer peripheral surface of the cylinder 83 at a position corresponding to the initial position of the piston 84, and a second reed switch 94 is provided thereon at the final position. Further, before the casing pushing air cylinder 82 is driven, the piston 84 is at the initial position, and when the casing pushing air cylinder 82 is driven, the piston 84 moved forwardly, and reaches the final position in due course of time. When the piston 84 reaches the final position, the second reed switch 94 issues a signal.

Upon receiving that signal, the controller 25A causes the piston 84 to return to the initial position, and, upon receiving the signal of the first reed switch 93 which is issued when the piston 84 has returned to the initial position, the controller 25A determines that the piston 84 is at a standstill at the initial position.

A description will be given of the operation of the stuffing apparatus 20. When a start switch is pressed, the stuffing nozzle air cylinder 45 is actuated, so that the stuffing nozzle 40 moves to the stuffing position, i.e., a position where the discharge port 42 of the stuffing nozzle 40 is positioned between the pincher device 70 and the braking member 58. During its movement, the stuffing nozzle 40 allows the shirred casing 43 to be loaded onto it, beginning with its open end side.

When the stuffing nozzle 40 stops at the stuffing position, the casing pusher 81 starts to move, and the driving of the stuffing pump 30 and the rotation of the stuffing nozzle 40 and the braking member 58 are started, thereby allowing a predetermined amount of material to be discharged continuously from the discharge port 42 into the deshirred casing 43a of the shirred casing 43. When the material is discharged, the shirred casing 43 is drawn out forwardly from the braking member 58 owing to stuffing pressure, and moves toward the pincher device 70. Meanwhile, the casing pusher 81 normally finishes its movement for abutment against the trailing end portion 44a of the shirred casing 43 before the material starts to be discharged.

The pincher members 76 of the pincher device 70 move closer to the outer periphery of the stuffing nozzle 40, move from the backward side toward the forward side of the discharge port 42, and start to pinch the stuffed casing 43b at a position close to the discharge port 42.

The pincher members 76 continue their movement about the drive shaft 72 and, after completion of the pinching of the stuffed casing 43b, the pincher members 76 pull the stuffed casing 43b along an axis X (see FIG. 4) and transport it to the forward side while maintaining the pinching state. If the stuffed casing 43b is pulled by the pincher members 76, the leading end portion 44b of the shirred casing 43 on the stuffing nozzle 40 is subjected to pressing action against the tapered opening portion 58b of the braking member 58, is drawn out and stretched to the forward side in the direction of the axis X, and moves in the form of the deshirred casing 43a. The shirred casing 43 is thus drawn out and stretched from the leading end portion 44b. In conjunction with this, the length of the shirred casing 43 gradually decreases.

Further, the trailing end portion 44a of the shirred casing 43 is abutted by the casing pusher 81 of the casing pushing device 80, so that the shirred casing 43 whose length has decreased is pushed forwardly by the casing pusher 81 and moves by a distance corresponding to the decreased length.

Since the leading end portion 44b of the shirred casing 43 is constantly pressed against the tapered hole portion of the braking member 58, the leading end portion 44b of the shirred casing 43 rotates together with the braking member 58, so that a continuous twist is imparted to the stuffed casing 43b at its pinched portion.

The aforementioned twisting of the stuffed casing 43b is continued until an ensuing pinching by the following pincher members 76 is completed. The pincher members 76 continue their continuous movement at a fixed speed, and the stuffing pump 30 continuously discharges the material into the deshirred casing 43a pulled out from the discharge port 42, thus continuously forming the stuffed casing 43b.

Further, when the foregoing operation continues and all the shirred casing 43 is stretched, the piston 84 of the casing pushing air cylinder 82 reaches the position of the second reed switch 94. Then, the second reed switch 94 outputs a signal, and the controller 25A, upon receiving that signal, causes the operation of the stuffing pump 30 and the like to stop to terminate stuffing and cause the stuffing nozzle air cylinder 45 and the casing pushing air cylinder 82 to return to their initial positions.

Figure 7:
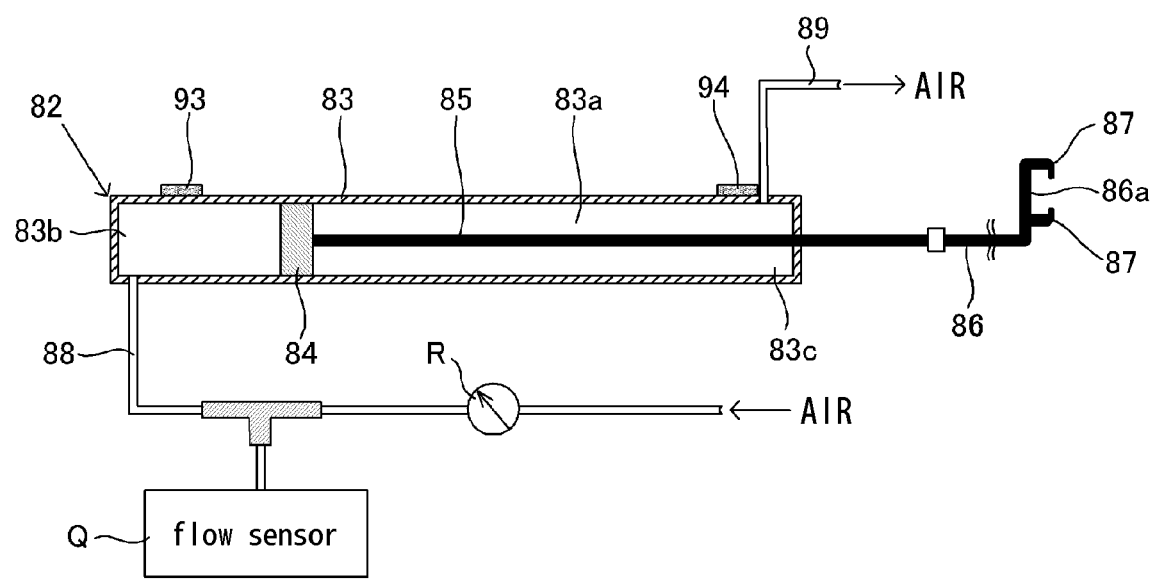
FIG. 7 is a schematic cross-sectional view of a state at the time of movement in which the movement stop detecting means is mounted on the casing pushing air cylinder.
Figure 8:
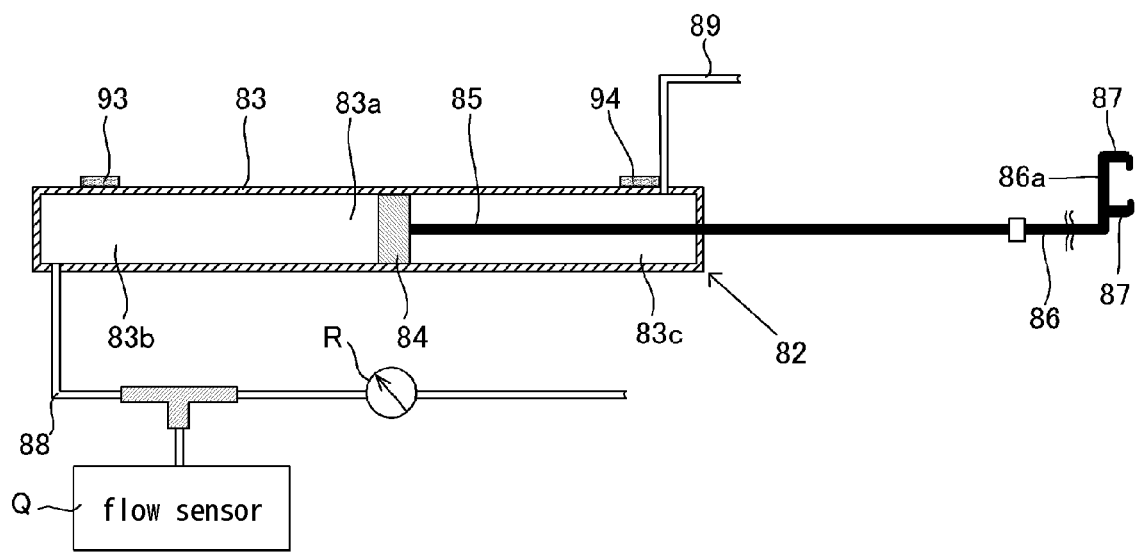
FIG. 8 is a schematic cross-sectional view of a state at the time of stoppage in which the movement stop detecting means is mounted on the casing pushing air cylinder.
Figure 9:
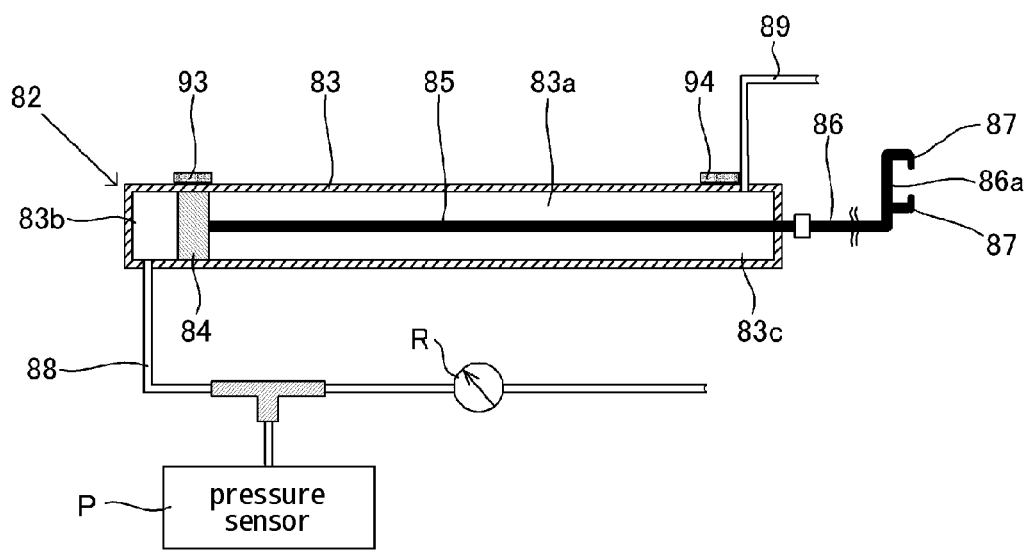
FIG. 9 is a schematic cross-sectional view of an initial state in which another movement stop detecting means is mounted on a casing pushing air cylinder.
Figure 10:
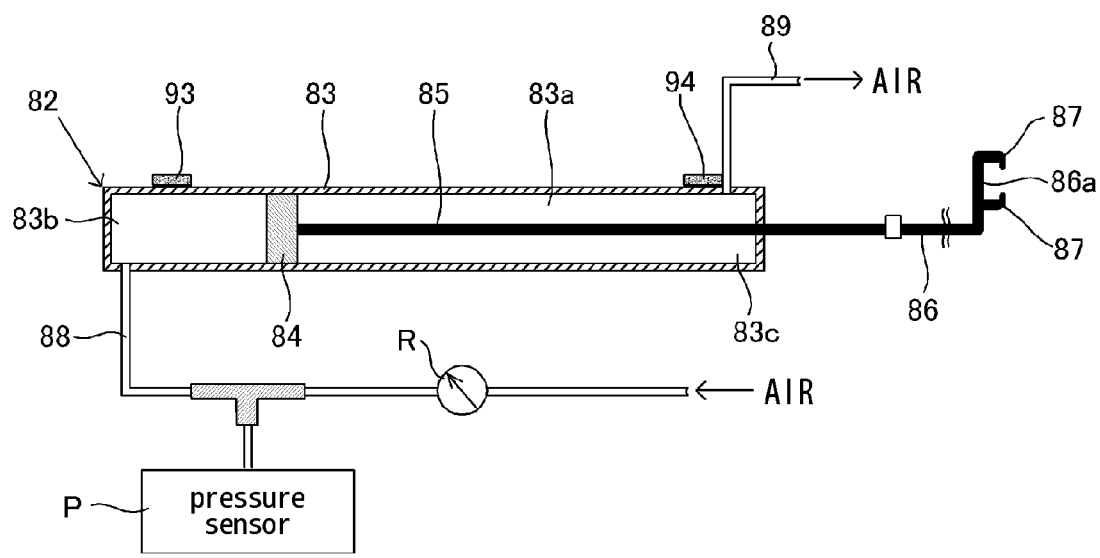
FIG. 10 is a schematic cross-sectional view of a state at the time of movement in which the other movement stop detecting means is mounted on the casing pushing air cylinder.
Figure 11:
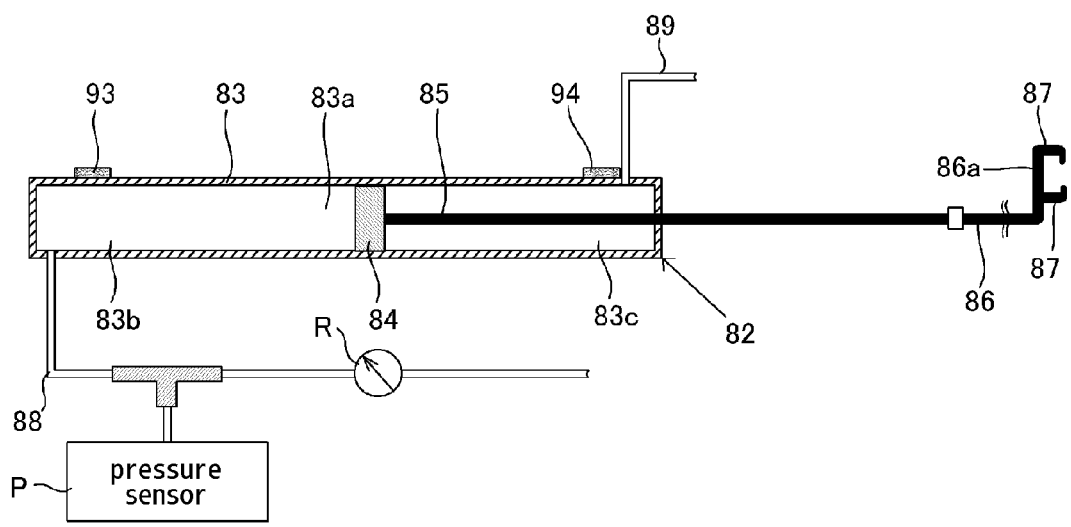
FIG. 11 is a schematic cross-sectional view of a state at the time of stoppage in which the other movement stop detecting means is mounted on the casing pushing air cylinder.

Next, a description will be given of the movement stop detecting means (casing breakage detecting device) 100 in accordance with the present invention. The flow sensor Q and the pressure sensor P correspond to the movement stop detecting means 100. FIGS. 6 to 8 show an example in which the flow sensor Q is used, and FIGS. 9 to 11 show an example in which the pressure sensor P is used.

In the example shown in FIGS. 6 to 8, the flow sensor Q is provided in the first passage 88 between the regulator R and the left chamber 83b to detect the flow rate of air flowing through the first passage 88. In the case where it is detected that the flow rate of air has become substantially zero during casing stuffing, it is determined that casing breakage has occurred, and the stuffing pump 30 and the like are stopped.

It should be noted that, as the flow sensor Q, a commercially available one, such as PFM 710 (manufactured by SMC Corporation) can be used. In addition, the flow sensor Q may be provided in the second passage 89.

FIG. 6 shows the initial state persisting immediately before the actuation of the casing pushing air cylinder 82. Since the stuffing nozzle 40 has not reached its stuffing position, the piston 84 is positioned at the initial position on the left side, and the casing pusher 81 is also positioned at its initial position. In this case, the flow sensor Q displays substantially zero.

FIG. 7 shows a state in which the casing pushing air cylinder 82 is moving, during which a predetermined amount of air is supplied through the first passage 88. In this case, since the flow rate varies due to the forward movement of the piston 84, the display by the flow sensor Q fluctuates in a range of 0.3 to 1.0 L/min (actual values). However, since the predetermined amount continues to be supplied, the reading does not reach substantially zero. Then, the piston 84, the rod 85, and the casing pusher 81 advance forwardly, and the stuffing operation continues until the piston 84 reaches the predetermined position on the right, i.e., until the shirred casing 43 is depleted.

FIG. 8 shows a state in which the casing pushing air cylinder 82 has stopped during casing stuffing. Namely, if the casing is ruptured during casing stuffing and a casing breakage occurs, the remaining portion of the shirred casing 43 on the stuffing nozzle 40 cannot be pulled out any further from the braking member 58, so that the leading end portion 44b of the shirred casing 43 remains at its position in a state of abutting against the braking member 58. Then, even if the casing pushing device 80 pushes the trailing end portion 44a of the shirred casing 43, the casing pushing device 80 is unable to move the shirred casing 43 forwardly any further, so that the piston 84, which is a part of the casing pushing device 80, also remains at that position.

In this case, although air of a predetermined pressure is present in the left chamber 83b, air does not flow, so that the display of the flow sensor Q becomes substantially zero. In addition, if the flow sensor Q displays substantially zero when the piston 84 is positioned between the initial position and the final position, the controller 25A of the stuffing apparatus 20 is so programmed as to stop the stuffing pump 30 and the like, so that the controller 25A, upon receiving the substantially zero signal from the flow sensor Q, causes the stuffing pump 30 and the like to stop. Namely, the casing breakage is indirectly detected.

As described above, the controller 25A, upon receiving the substantially zero signal from the flow sensor Q, causes the stuffing pump 30 and the like to stop, causes the piston 45b and the piston 84 of the stuffing nozzle air cylinder 45 and the casing pushing air cylinder 82 to return to their initial positions, and then causes the operation of the stuffing apparatus 20 to stop.

Referring to the flowchart of FIG. 13, a description will be given of the control flow of the controller 25A concerning the movement stop detecting means (casing breakage detecting device) 100. When the operator turns on the start switch of the stuffing apparatus 20 in Step S1, the solenoid valve 47d is switched over to cause the stuffing nozzle 40 to advance. Subsequently, the casing pushing air cylinder 82, the stuffing pump 30, the pincher device 70, and the like start to operate.

When the casing pushing air cylinder 82 starts to be actuated, the flow rate of air flowing through the first passage 88 is detected by the flow sensor Q in Step S2. In this case, one of the values which fluctuate in the range of 0.3 to 1.0 L/min is displayed in terms of actual results.

When the detection of the flow rate of air is effected by the flow sensor Q, a determination is made in Step S3 as to whether or not the flow rate of air is within the predetermined range, i.e., whether it is within the range of 0.3 to 1.0 L/min. If an affirmative determination is made that it is within the predetermined range, i.e., if it is determined that casing breakage has not occurred, the process proceeds to Step S4 to continue the operation. If the continuation of operation is executed, the process returns to Step S2 to repeat the above-described steps.

If a negative determination is made in Step S3 that the flow rate of air is not within the predetermined range (i.e., it is substantially zero), i.e., if it is determined that casing breakage has occurred and the casing pushing device 80 has been stopped, the process advances to Step S5 to stop the operation of the stuffing pump 30 and the like. Although not shown in the flow, the piston 45b of the stuffing nozzle air cylinder 45 is also returned to its initial position.

In the example shown in FIGS. 9 to 11, the pressure sensor P is provided in the first passage 88 between the regulator R and the left chamber 83b to detect the pressure within the first passage 88 (which is also pressure within the left chamber 83b). In the case where the pressure within the first passage 88 has risen to a set pressure of the regulator R during casing stuffing, it is determined that casing breakage has occurred, and the stuffing pump 30 and the like are stopped.

It should be noted that, as the pressure sensor P, a commercially available one, such as AP-C30 (manufactured by KEYENCE CORPORATION) can be used.

In this example, the pressure of air which is supplied is set to 100 Kps by the regulator R. When this pressure is applied to the left chamber 83b of the cylinder, if the piston 84 is stopped, the pressure within the left chamber 83b is 100 Kps. However, if the piston 84 moves rightwardly and the volume of the left chamber 83b increases, the pressure drops and the dropped pressure is displayed. Then, if the piston 84 stops, the pressure increases again to the set pressure of 100 Kps. This example makes use of this pressure fluctuation.

FIG. 9 shows the initial state persisting immediately before the actuation of the casing pushing air cylinder 82. Since the stuffing nozzle 40 has not reached the stuffing position, the piston 84 is positioned at a leftmost side (backward side), and the casing pusher 81 is also positioned at its rearmost position. In this case, the pressure sensor P displays 100 Kps.

FIG. 10 shows a state in which the casing pushing air cylinder 82 is moving, during which a predetermined amount of air is supplied through the first passage 88. In this case, since the volume of the left chamber 83 increases due to the forward movement of the piston 84, the display by the pressure sensor P fluctuates in a reduce pressure range of approximately 90 to 95 Kps in consequence of the increase of the volume. Then, the piston 84, the rod 85, and the casing pusher 81 (see FIG. 12) advance forwardly, and the stuffing operation continues until the piston 84 reaches the final position on the right, i.e., until the shirred casing 43 is depleted.

FIG. 11 shows a state in which the casing pushing air cylinder 82 has stopped during casing stuffing. Namely, if a casing breakage occurs during casing stuffing, the casing pusher 81 (see FIG. 12) and the piston 84 stop at those positions, as already described above. Then, the pressure within the left chamber 83b increases to 100 Kps similar to that shown in FIG. 9 in an initial state.

The controller 25A of the stuffing apparatus 20 is so programmed as to stop the stuffing pump 30 and the like when the pressure sensor P for detecting the pressure within the first passage 88 or the left chamber 83b detects 100 Kps, i.e., the pressure in the initial state, during casing stuffing. For this reason, when the pressure within the left chamber 83b returns to the set pressure (i.e., the pressure increases), the stuffing pump 30 and the like are stopped, as described above. Namely, the pressure sensor P indirectly detects casing breakage.

Figure 13:
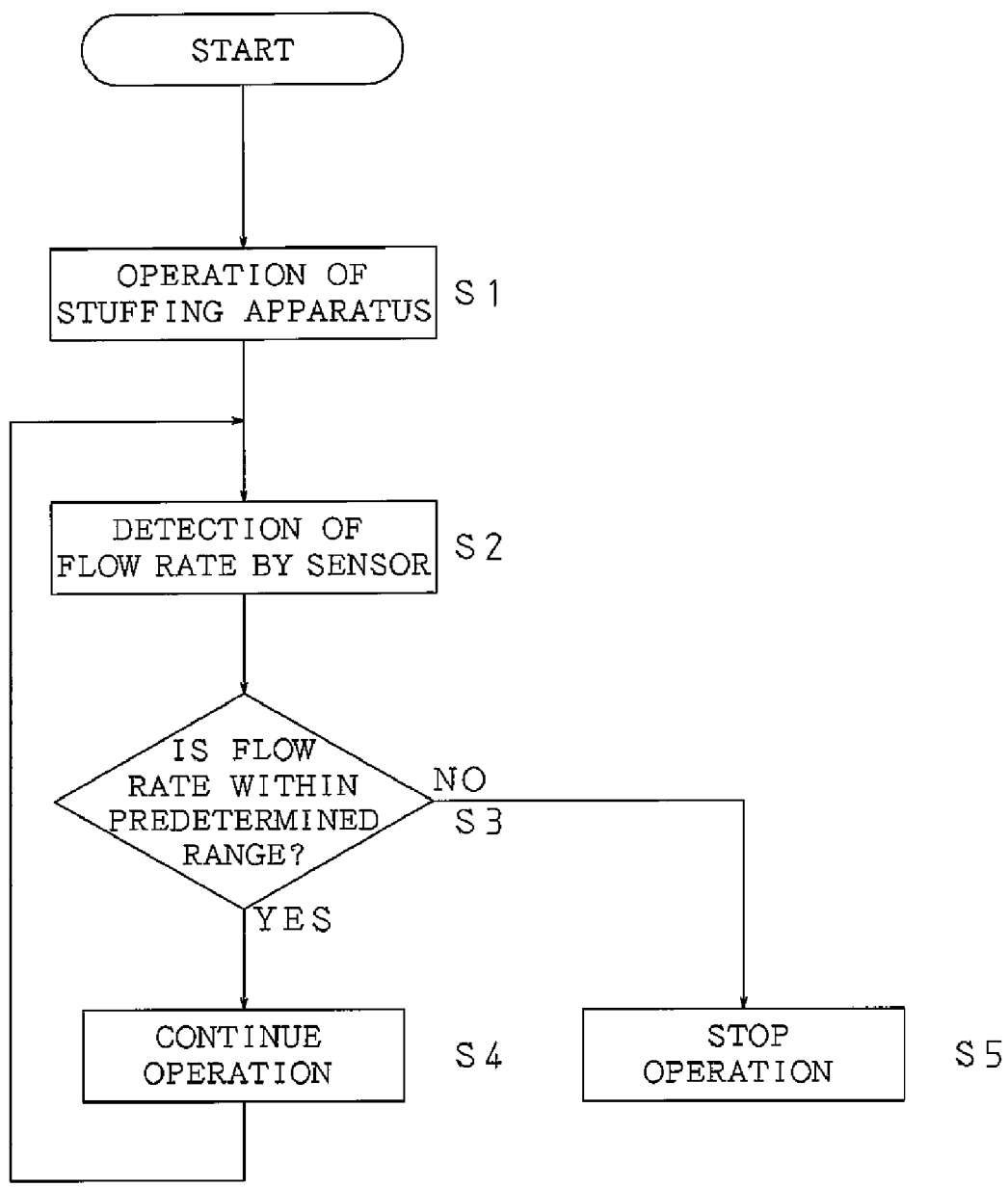
FIG. 13 is a flowchart for describing a flow of control of a movement stop detecting means by a controller.

It should be noted that, as for the control flow in this case, the determination in Step S3 in FIG. 13 changes to "IS PRESSURE WITHIN PREDETERMINED RANGE (I.E., APPROX. 90-95 Kps?)" and since the remainder is the same, a description thereof will be omitted.

Thus, since the movement stop detecting means (casing breakage detecting device) 100, which is constituted by the flow sensor Q or the pressure sensor P, is provided on the rearward side far distant from the discharge port 42 of the stuffing nozzle 40, the staining of the movement stop detecting means 100 due to the material and the like is reduced. In addition, as this movement stop detecting means 100 is provided in the box 91, the staining due to the material and the like is substantially completely nil.

Figure 14:
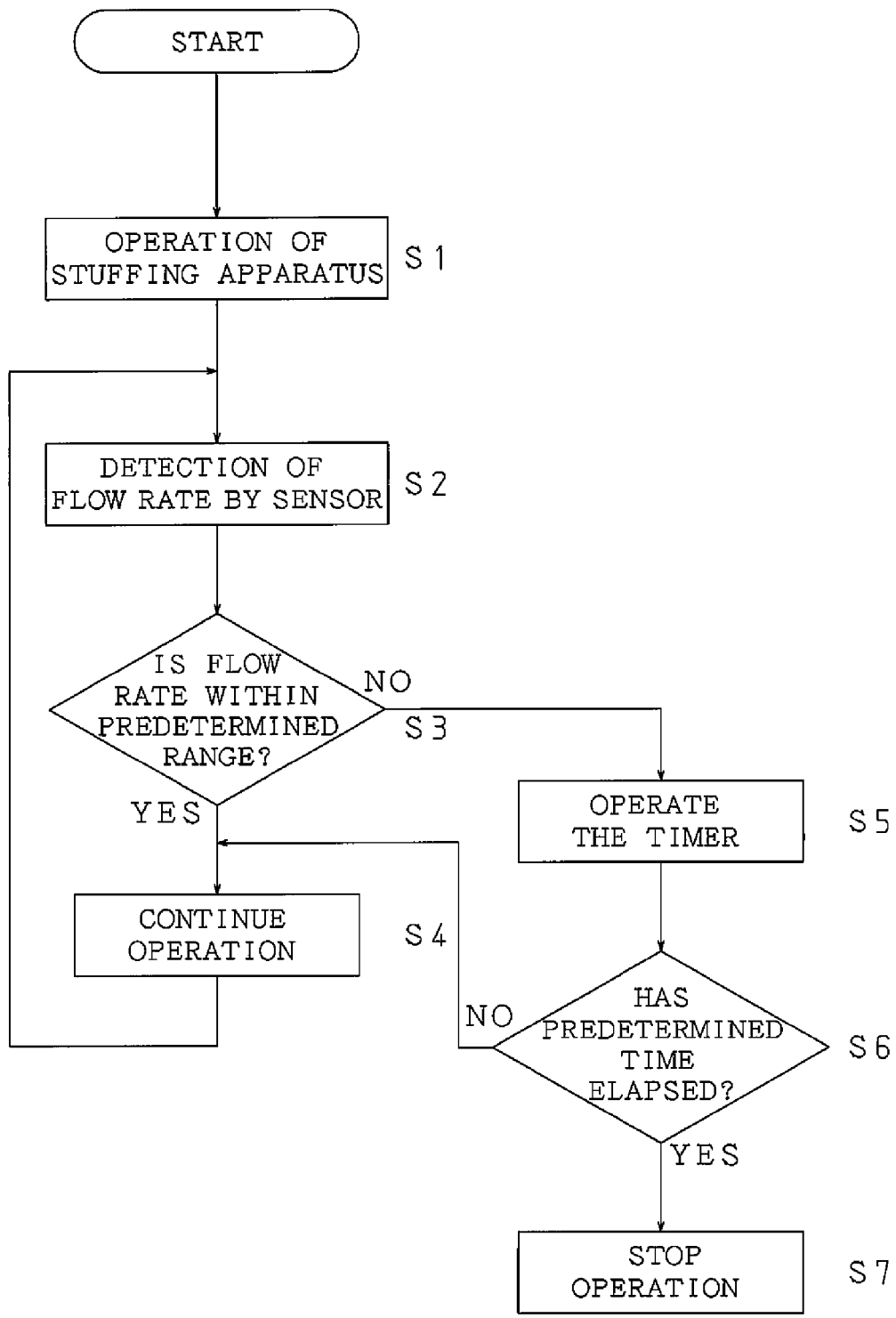
FIG. 14 is a flowchart for describing another flow of control of the movement stop detecting means by the controller.

Incidentally, the operation of the casing pushing device 80 in the course of its movement is continuous. However, if variations occur in the rate of reduction of the creased casing stick length due to variations of the compression ratio of the shirred casing 43 which is a hollow creased casing stick, there can occur cases where the casing pushing device 80, which is moving in a state of abutting against the trailing end portion 44a of the creased casing stick, undergoes an intermittent movement in which it stops momentarily and subsequently starts to move. In the case where the casing pushing device 80 undergoes such an intermittent movement (this, of course, is a case where casing breakage has not occurred), and if the movement stop detecting means (casing breakage detecting device) 100 detects the momentary stoppage of the casing pushing device 80, and the stuffing pump 30 and the like are stopped, production efficiency declines by the shutdown portion of the stuffing apparatus 20. FIG. 14 shows a control flow for preventing such erroneous detection described above.

When the operator turns on the start switch of the stuffing apparatus 20 in Step S1, the solenoid valve 47d is switched over to cause the stuffing nozzle 40 to advance. Subsequently, the casing pushing air cylinder 82, the stuffing pump 30, the pincher device 70, and the like start to operate.

When the casing pushing air cylinder 82 starts to be actuated, the flow rate of air flowing through the first passage 88 is detected by the flow sensor Q in Step S2. In this case, one of the values which fluctuate in the range of 0.3 to 1.0 L/min is displayed in terms of actual results.

When the detection of the flow rate of air is effected by the flow sensor Q, a determination is made in Step S3 as to whether or not the flow rate of air is within the predetermined range, i.e., whether it is within the range of 0.3 to 1.0 L/min. If an affirmative determination is made that it is within the predetermined range, i.e., if it is determined that casing breakage has not occurred, the process proceeds to Step S4 to continue the operation. If the continuation of operation is executed, the process returns to Step S2 to repeat the above-described steps.

If a negative determination is made in Step S3 that the flow rate of air is not within the predetermined range (i.e., it is substantially zero), i.e., if it is determined that casing breakage has occurred and the casing pushing device 80 has been stopped, the process advances to Step S5 to operate a timer.

If the timer is operated in Step S5, a determination is made in step S6 as to whether or not a predetermined time duration (e.g., within 0.5 second) has elapsed. If a negative determination is made that the predetermined time duration has not elapsed, the process returns to Step S4 to repeat the above-described steps. Then, if an affirmative determination is made in Step S6 that the predetermined time duration has elapsed, i.e., if the flow rate has not been within a predetermined range for a predetermined time period, the process proceeds to Step S7 to stop the operation of the stuffing pump 30 and the like.

Thus, even if the stoppage of the casing pushing device 80 is detected, by adopting a control form of monitoring that state for a predetermined time duration, it is possible to prevent the erroneous operation of the stuffing apparatus 20, thereby making it possible to prevent a decline in the production efficiency.

It should be noted that in the case where the pressure sensor P is used, "OPERATE THE TIMER" in the aforementioned Step S5 and "HAS PREDETERMINED TIME ELAPSED?" in the aforementioned Step S6 are provided between Step S3: "IS PRESSURE WITHIN PREDETERMINED RANGE?" and Step S5: "STOP OPERATION."

The present invention is not limited to the construction of the above-described embodiment, and appropriate design changes are possible within the scope that does not depart from the gist of the invention. For example, the present invention is also applicable to a stuffing apparatus in which the stuffing nozzle and/or the braking member are not rotated, a stuffing apparatus which does not have the pincher device, and a stuffing apparatus for sausage products of a nontwisted straight shape. Furthermore, the use of natural intestine casings as the shirred casings is not precluded.

What is claimed is:

1. A stuffing apparatus comprising:
   a stuffing nozzle for discharging a stuffing material from a discharge port into a casing;
   a stuffing pump for feeding the stuffing material into said stuffing nozzle;
   a casing pushing device which has a fluid cylinder having a cylinder, a piston, and a rod with one end thereof coupled to the piston and another end thereof projecting from an end portion of the cylinder in a direction of forward movement of the piston and has a casing pusher provided forwardly of the other end in the direction of forward movement of the piston and adapted to forwardly move in synchronism with the forward movement of the piston, said casing pushing device being adapted to cause a trailing end portion of a shirred casing which is yet to be stuffed and is in a shirred state to be pushed during stuffing in a direction toward the discharge port of said stuffing nozzle in a direction in which the stuffing material is discharged from the discharge port, by forward movement of said casing pusher abutting against the trailing end portion;
   a braking member which is disposed around said stuffing nozzle and is abutted by a leading end portion of the shirred casing which is located closer to a side of the discharge portion of said stuffing nozzle than the trailing end portion of the shirred casing abutted by said casing pusher; and
   movement stop detecting means for detecting stoppage of said casing pusher in the course of its forward movement,
   wherein the forward movement of said casing pusher is forward movement toward said braking member together with the trailing end in a state in which said casing pusher abuts against the trailing end portion of the shirred casing whose length is being decreased while the stuffing material is being stuffed into a deshirred casing,
   in a case where said casing pusher has stopped in the course of its forward movement together with the trailing end portion of the shirred casing which stopped in the course of the forward movement owing to the occurrence of a casing breakage, the stoppage of said casing pusher in the course of its forward movement is detected by said movement stop detecting means so as to stop said stuffing pump, and
   said movement stop detecting means is provided in a passage communicating with said fluid cylinder which is at a standstill in a state in which said casing pusher abuts against the trailing end portion of the shirred casing which stopped in the course of its forward movement, so as to detect a state of a fluid in said passage.

2. The stuffing apparatus according to claim 1, wherein said movement stop detecting means detects a flow rate of air in said passage as the state of the fluid in said passage.

3. The stuffing apparatus according to claim 1, wherein said movement stop detecting means detects a pressure of air in said passage as the state of the fluid in said passage.

4. The stuffing apparatus according to claim 1, wherein a time of detection by said movement stop detecting means for stopping said stuffing pump is a time when said casing pusher stops continuously for a predetermined time duration in the course of its forward movement.

5. The stuffing apparatus according to claim 2, wherein said movement stop detecting means detects a pressure of air in said passage as the state of the fluid in said passage.

6. A casing breakage detecting device for a stuffing apparatus including a stuffing nozzle for discharging a stuffing material from a discharge port into a casing, a stuffing pump for feeding the stuffing material into said stuffing nozzle, a casing pushing device which has a fluid cylinder having a cylinder, a piston, and a rod with one end thereof coupled to the piston and another end thereof projecting from an end portion of the cylinder in a direction of forward movement of the piston and has a casing pusher provided forwardly of the other end in the direction of forward movement of the piston and adapted to forwardly move in synchronism with the forward movement of the piston, said casing pushing device being adapted to cause a trailing end portion of a shirred casing which is yet to be stuffed and is in a shirred state to be pushed during stuffing in a direction toward the discharge port of said stuffing nozzle in a direction in which the stuffing material is discharged from the discharge port, by forward movement of said casing pusher abutting against the trailing end portion, and a braking member which is disposed around said stuffing nozzle and is abutted by a leading end portion of the shirred casing which is located closer to a side of the discharge portion of said stuffing nozzle than the trailing end portion of the shirred casing abutted by said casing pusher, the forward movement of said casing pusher being forward movement toward said braking member together with the trailing end in a state in which said casing pusher abuts against the trailing end portion of the shirred casing whose length is being decreased while the stuffing material is being stuffed into a deshirred casing, said casing breakage detecting device comprising:

movement stop detecting means which detects stoppage of said casing pusher in the course of its forward movement in a case where said casing pusher has stopped in the course of its forward movement together with the trailing end portion of the shirred casing which stopped in the course of the forward movement owing to the occurrence of a casing breakage, whereupon said movement stop detecting means outputs a signal for stopping said stuffing pump, wherein said movement stop detecting means is provided in a passage communicating with said fluid cylinder which is at a standstill in a state in which said casing pusher abuts against the trailing end portion of the shirred casing which stopped in the course of its forward movement, so as to detect a state of a fluid in said passage.

7. The casing breakage detecting device according to claim 6, wherein said movement stop detecting means detects a flow rate of air in said passage as the state of the fluid in said passage.

8. The casing breakage detecting device according to claim 6, wherein said movement stop detecting means detects a pressure of air in said passage as the state of the fluid in said passage.

* * * * *